(12) United States Patent
Deboes et al.

(10) Patent No.: US 6,791,394 B2
(45) Date of Patent: Sep. 14, 2004

(54) POWER SUPPLY CONTROL CIRCUITS

(75) Inventors: Frederic N. F. Deboes, Austin, TX (US); Ludmil N. Nikolov, Chippenham (GB); Hans W. Klein, Danville, CA (US); Geoffrey R. Richard, Cirencester (GB)

(73) Assignee: Lattice Semiconductor Corporation, Hillsboro, OR (US)

( * ) Notice: Subject to any disclaimer, the term of this patent is extended or adjusted under 35 U.S.C. 154(b) by 103 days.

(21) Appl. No.: 10/269,450

(22) Filed: Oct. 10, 2002

(65) Prior Publication Data

US 2004/0070998 A1 Apr. 15, 2004

(51) Int. Cl.[7] .............................................. G05F 1/10
(52) U.S. Cl. ...................................................... 327/536
(58) Field of Search ........................... 323/312; 363/59, 363/60; 327/536

(56) References Cited

U.S. PATENT DOCUMENTS

| | | | | |
|---|---|---|---|---|
| 5,362,990 A | * | 11/1994 | Alvarez et al. | 327/538 |
| 5,369,376 A | * | 11/1994 | Leblebicioglu | 331/8 |
| 5,760,637 A | * | 6/1998 | Wong et al. | 327/536 |
| 5,889,701 A | * | 3/1999 | Kang et al. | 365/185.19 |
| 6,462,594 B1 | * | 10/2002 | Robinson et al. | 327/159 |
| 6,624,668 B1 | * | 9/2003 | Robinson et al. | 327/103 |

OTHER PUBLICATIONS

Summit Microelectronics, Inc. *SMT4004, Quad Tracking Power Supply Manager*, Summit Microelectronics, Inc. 2001, pp. 1–35.
Summit Microelectronics, Inc. *SMT4214, Expandable Four--Rail Tracking Manager*, Summit Microelectronics, Inc. 2001, pp. 1–17.
Analog Devices, *Communications System Supervisory/Sequencing Circuit*, Analog Devices, Inc., 2002, pp. 1–45.

* cited by examiner

*Primary Examiner*—Adolf Berhane
(74) *Attorney, Agent, or Firm*—MacPherson Kwok Chen & Heid LLP; Greg J. Michelson

(57) ABSTRACT

Power supply sequencing systems and methods are disclosed. In one embodiment, a programmable charge pump supplies a programmable current source, which drives an external NFET that controls whether power is supplied to a device or a portion of circuitry. The maximum voltage and the turn-on ramp rate supplied to the NFET are programmable and, therefore, the NFET can be operated safely within its rated limits without requiring external protection devices. If a high-voltage output terminal is not required to drive an external NFET, the output terminal, in accordance with another embodiment, may be configured to function as an open drain logic output terminal.

31 Claims, 9 Drawing Sheets

POWER SUPPLY CONTROL CIRCUITS

TECHNICAL FIELD

The present invention relates generally to electrical circuits and, more particularly, to power supply control circuits, to control for example the switching of field effect transistors for power-supply sequencing applications.

BACKGROUND

Various techniques may be employed to control when a printed circuit board or a portion of a system is supplied with power. For example, one technique employs power MOSFET (metal oxide semiconductor field effect transistor) devices to effectively act as electronic switches that control when power is applied to the printed circuit board or the portion of the system. Typically, N-channel MOSFETs (also referred to as NFETs or power NFETs) are utilized because of their lower on-resistance and lower cost.

When positive power supplies are switched with these power NFETs, it is necessary to supply a gate voltage to the power NFETs that exceeds the supply voltage they switch by several volts. However, FETs (e.g., NFETs or other types of MOSFETs) are sensitive to over-voltage at their control gates and some form of clamping or voltage monitoring must be provided to avoid possible destruction of the FETs.

Furthermore, the rate at which the NFETs are to be switched on is critical. If switched on too fast, load currents rush into the system or printed circuit board at an excessive rate, which may force the master power supply to go into limit mode or cause various reliability or malfunction problems. If switched on too slowly, the NFET devices may remain in a high-resistance mode for too long and heat up to a point where they can self-destruct.

There are numerous types of power NFETs having different characteristics and requirements for voltage and current parameters. Conventional integrated circuits that control these power NFETs generally require the use of external clamping (i.e., voltage protection) devices to limit the gate voltage along with external shunt capacitors to slow down the turn-on time and avoid exceeding power NFET safe operating limits. These additional discrete and specialized components, that are external to the integrated circuit, occupy valuable printed circuit board space, add to the manufacturing cost, and allow limited control, flexibility, or field programmability. As a result, there is a need to provide improved power supply control circuits.

SUMMARY

Power supply control circuits and methods are disclosed herein. For example, in accordance with an embodiment of the present invention, a programmable current source with voltage compliance regulation through programmable feedback is provided to control one or more external power NFETs for power-supply sequencing applications. The programmable current source is combined with a programmable regulated boost supply (e.g., a high-voltage charge pump) to provide a fully integrated solution. Furthermore, with the turn-on ramp rate and the maximum output voltage programmable, a user can select the most desirable settings and operate the power NFET safely within its rated limits. Consequently, external clamping or shunting devices are not required.

Alternatively, in accordance with one or more embodiments of the present invention, either a current source or a regulated boost supply may be programmable. Furthermore, a current sink and/or an open drain circuit may be provided, with the open drain circuit providing an open drain logic output configuration if an output from the current source is not provided.

More specifically, in accordance with one embodiment of the present invention, a circuit includes a regulated boost supply, adapted to provide a programmable supply voltage, and a current source, coupled to the regulated boost supply, adapted to receive the programmable supply voltage and provide a programmable current.

In accordance with another embodiment of the present invention, a method of switching a transistor for power sequencing applications includes providing a programmable voltage that determines a desired voltage applied to a gate terminal of the transistor and providing a programmable current that receives the programmable voltage and determines a desired voltage ramp rate at the gate terminal of the transistor.

In accordance with another embodiment of the present invention, a circuit includes a regulated boost supply adapted to provide a supply voltage, and a current source, coupled to the regulated boost supply, adapted to receive the supply voltage and provide a programmable current.

In accordance with another embodiment of the present invention, a circuit includes a regulated boost supply adapted to provide a programmable supply voltage, and a current source, coupled to the regulated boost supply, adapted to receive the programmable supply voltage and provide a current.

In accordance with another embodiment of the present invention, a circuit includes a regulated boost supply adapted to provide a supply voltage, the boost supply including a feedback loop responsive to a reference voltage for maintaining a desired setting for the supply voltage, and a current source, coupled to the regulated boost supply, adapted to receive the supply voltage and provide a current.

In accordance with another embodiment of the present invention, a circuit includes a regulated boost supply adapted to provide a supply voltage, and a current source, coupled to the regulated boost supply, adapted to receive the programmable supply voltage and a reference current and provide an output current that is a multiple of the reference current.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
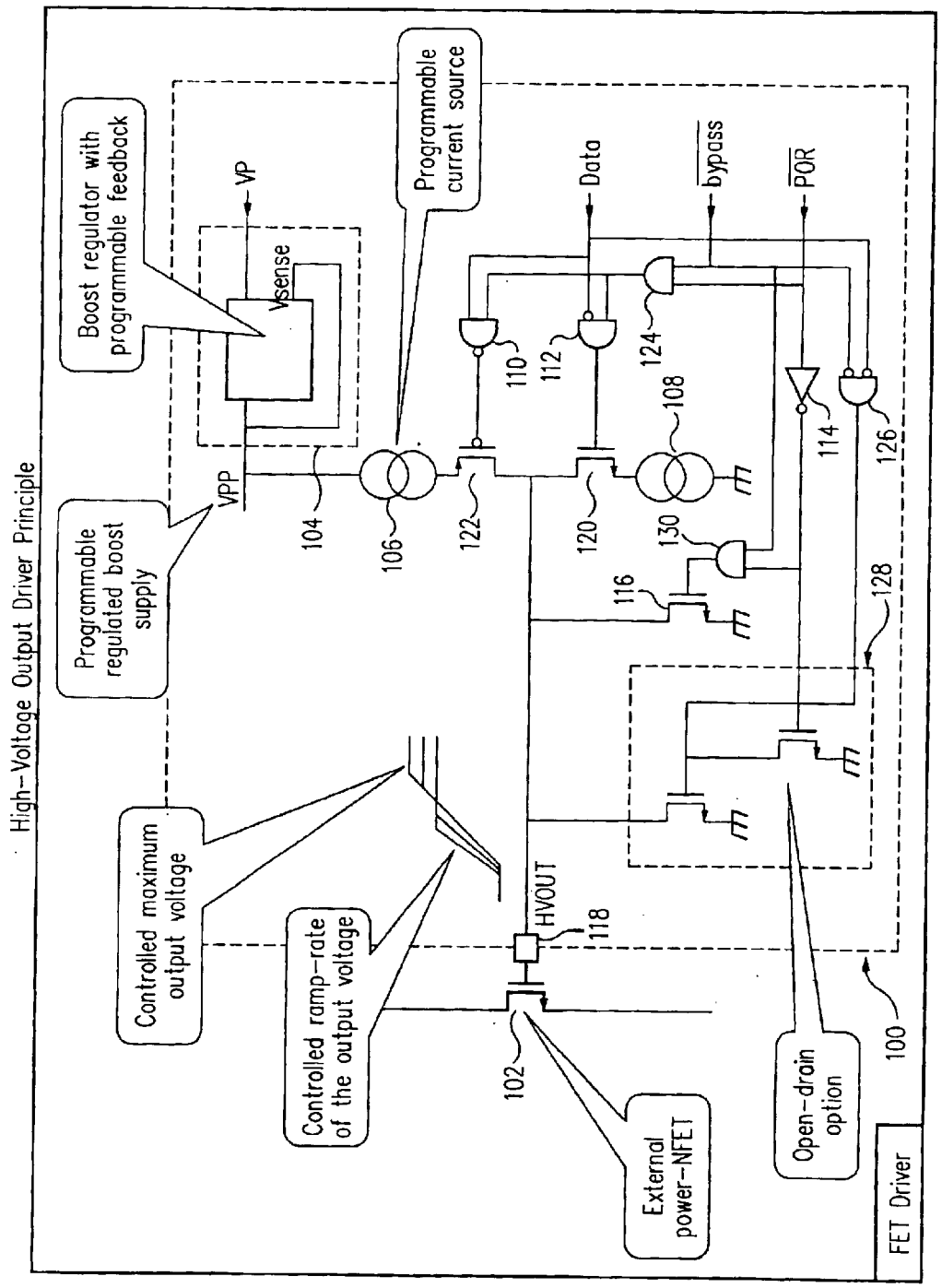
FIG. 1 shows a block diagram illustrating a power control circuit in accordance with an embodiment of the present invention.

FIG. 1 shows a block diagram illustrating a power control circuit 100 in accordance with an embodiment of the present invention. Power control circuit 100 illustrates at a top level circuit techniques that are employed to control and drive, for example, an external power NFET 102. Power control circuit 100 provides for a controlled turn-on phase of power NFET 102 and prevents power NFET 102 from break down due to excessive voltage stress, without requiring supplemental protection devices external to the integrated circuit. Furthermore, power control circuit 100 may be packaged as an integrated circuit or incorporated into an integrated circuit to form a portion of its circuitry and employed to control high-voltage FET drivers, such as power NFET 102, for power-supply sequencing applications.

Power control circuit 100 includes a programmable regulated boost supply 104 and a programmable current source 106. Programmable regulated boost supply 104 functions as a programmable boost-based supply voltage (vpp) (i.e., a programmable supply voltage) for programmable current source 106 by boosting a voltage level of a supply voltage (vp). For example, programmable regulated boost supply 104 (i.e., a voltage boost circuit) is used to generate the high voltage required (e.g., 3 to 8 volts (V) above a voltage level at a source terminal of external power NFET 102 and up to 7.5 V above the supply voltage (vp)). Programmable regulated boost supply 104 may be, for example, any type of voltage boost or boost converter device, such as capacitive or inductive based devices, including a charge pump.

Programmable current source 106 provides a programmable current to a gate terminal of external power NFET 102 via a connector 118 (e.g., an integrated circuit pin or terminal). The programmable current driven into the gate terminal of power NFET 102 results in a controlled ramp as the gate structure capacitance of power NFET 102 is charged. By selecting the desired current and voltage, the desired ramp-rate of the output voltage and maximum output voltage applied to the gate of power NFET 102 is determined, as illustrated in FIG. 1. Consequently, external clamping devices to limit the gate voltage and external shunt capacitors to slow down the turn-on time of power NFET 102 are not required.

The programmable settings (e.g., voltage feedback loop settings and/or current rate settings) allow for differences in safe operating limits for an external power NFET, depending upon its characteristics and requirements as set forth by various device manufacturers or suppliers, and also for differences in the available supply voltage. The power NFET can then be controlled safely, without requiring external components, and the programmable settings can be stored by utilizing memory, for example on-chip electrically erasable programmable read only memory (EEPROM), that would be available upon power up.

Also illustrated in FIG. 1 are management or enabling and disabling circuitry, which are represented by logic gates 110, 112, 114, and 130, transistors 116, 120, and 122, and a current sink 108. Logic gate 110 controls transistor 122, which determines whether the current from programmable current source 106 is supplied to power NFET 102 (e.g., to switch on power NFET 102). Logic gate 112 controls transistor 120, which determines whether current sink 108 and transistor 120 provide a discharge path for the gate terminal of power NFET 102. Inverter 114, logic gate 130, and transistor 116 represent a power-on reset capability when a power-on reset (POR) signal is asserted and a bypass signal is not asserted.

An open drain logic output capability at connector 118 may also be provided by employing logic gates 124 and 126 and an open drain circuit 128. The bypass signal determines whether connector 118 serves as an open drain logic output or as a high voltage output. For example, if the bypass signal and the POR signal are not asserted and a data signal is asserted, then logic gate 110 switches on transistor 122 to provide the high voltage output to connector 118. If the bypass signal, the POR signal, and the data signal are not asserted, then logic gate 112 switches on transistor 120 to provide a discharge path through current sink 108. If the bypass signal is asserted, then the data signal controls logic gate 126 to provide the open drain logic output at connector 118 via open drain circuit 128.

Power control circuit 100 provides a fully integrated solution, which is achieved by utilizing programmable current source 106 that operates off programmable regulated boost supply 104. An active feedback loop (i.e., Vsense path) is employed within programmable regulated boost supply 104 to limit and maintain a specific maximum programmable voltage level at its output and, therefore, also at the gate of power NFET 102. The feedback loop has been made programmable, which allows the maximum output voltage to be programmable, as described in further detail herein.

Figure 2A:
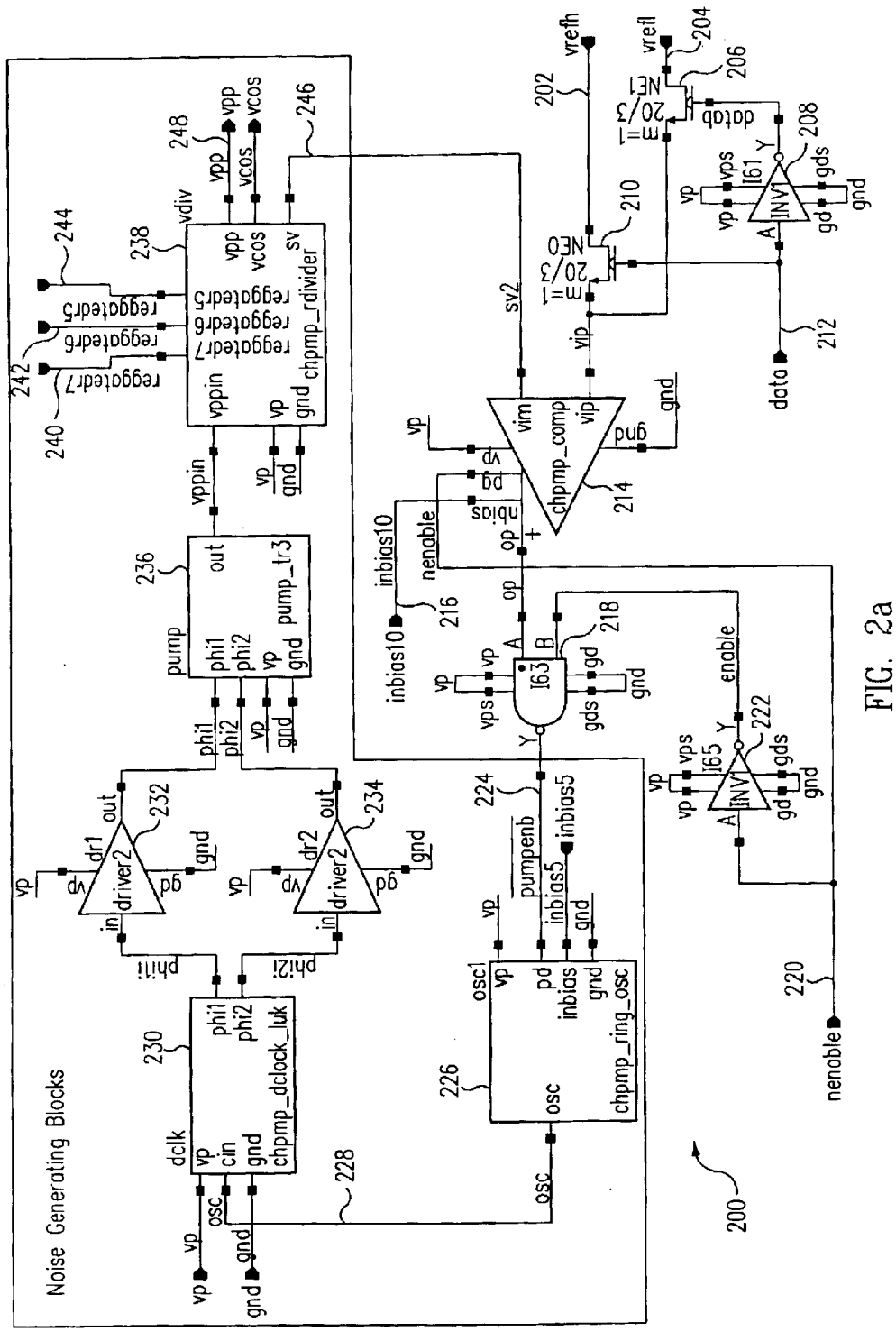
FIG. 2a shows a block diagram illustrating a programmable charge pump in accordance with an embodiment of the present invention.

FIG. 2a shows a block diagram illustrating a programmable charge pump 200 in accordance with an embodiment of the present invention. Programmable charge pump 200 represents an exemplary circuit diagram for programmable regulated boost supply 104 (FIG. 1). It should be noted in general for the figures herein that a general supply voltage connection is indicated by the label "vp" and that a ground connection is indicated by the label "gd" or "gnd."

Programmable charge pump 200 provides a programmable charge-pump based supply voltage (labeled vpp on a line 248 and corresponding to the programmable boost-based supply voltage (vpp) of FIG. 1) for a programmable current source, with the programmable charge-pump based supply voltage (vpp) determining the maximum output voltage applied to the gate of an external NFET, as discussed herein. Programmable charge pump 200 includes an internal feedback path (a line 246) that provides a selectable divided-down supply voltage (labeled sv2), corresponding to but at a lower voltage than the programmable charge-pump based supply voltage (vpp), to compare to selectable reference voltages (vrefl and vrefh, which are at voltage levels of, for example, 0.85 V and 1.0 V, respectively) to provide full programmability, as explained below.

Programmable charge pump 200 receives a data signal through a line 212, which selects a high reference voltage (vrefh on a line 202) or a low reference voltage (vrefl on a line 204) by employing an inverter 208 and transistors 206 and 210. For example, the low reference voltage may be selected when the programmable current source is active, but in an off state (e.g., output at connector 118 set at a logic low by current sink 108 of FIG. 1). The selection of the low reference voltage under this exemplary circumstance ensures that the programmable charge-pump based supply voltage (vpp) is kept within its safe operating limit.

The selected reference voltage (vrefh or vrefl) is received by a comparator 214 and compared to the divided-down supply voltage (sv2), with comparator 214 providing an output signal (e.g., a logic high or a logic low) to a gate (NAND) 218. The output signal is a logic high if the selected reference voltage is at a higher voltage than the divided-down supply voltage (sv2) and is at a logic low otherwise.

Comparator 214 also receives a bias current (inbias10, e.g., of 10 μA) on a line 216 and a nenable signal (i.e., NOT enable) on line 220, which is the complement of an enable signal. If the enable signal is not asserted (i.e., the enable signal and the nenable signal are logic low and logic high, respectively), then programmable charge pump 200 does not actively produce the programmable charge-pump based supply voltage (vpp) and, optionally, for example in accordance with an embodiment of the present invention, power control circuit 100 may be configured to provide an open-drain output (e.g., at connector 118), as explained further herein.

If the enable signal is asserted (i.e., the enable signal and the nenable signal are logic high and logic low, respectively) and the output signal from comparator 214 is a logic high, gate 218 (which receives the enable signal via an inverter 222) provides a logic low signal on a line 224 (labeled NOT pumpenb or pumpenb bar). A charge pump ring oscillator circuit 226, upon receiving the logic low signal on line 224, provides a clock signal (i.e. an oscillator signal labeled osc) on a line 228 to a clock circuit 230. The frequency of the clock signal may be inversely proportional to the supply voltage (vp) (i.e., the greater the supply voltage the lower the frequency) to compensate for the pump efficiency of programmable charge pump 200 whose pump efficiency increases as the supply voltage (vp) increases. Charge pump ring oscillator circuit 226 also receives a bias current (labeled inbias5, e.g., of 5 μA).

Clock circuit 230, upon receipt of the oscillator signal on line 228, provides two clock signals (phi1 and phi2) of varying phases to a charge pump 236 via buffers 232 and 234, respectively. Buffers 232 and 234 are employed to overcome any capacitive loading that may be present. Charge pump 236 receives the clock signals (phi1 and phi2) and pumps up a voltage level of a programmable charge pump voltage (vppin), which is provided to a voltage divider circuit 238.

Voltage divider circuit 238 provides the programmable charge-pump based supply voltage (vpp on a line 248) to a programmable current source, as described herein, and also provides the divided-down supply voltage (sv2) to comparator 214, as mentioned above. The divided-down supply voltage corresponds to the programmable charge-pump based supply voltage (vpp), but divided down to a lower voltage level for comparison to internally generated reference voltages (i.e., vrefl and vrefh) that are at lower voltage levels.

For example, voltage divider circuit 238 may represent a resistor-divider network that divides down the programmable charge-pump based supply voltage (vpp) based upon a selectable ratio. The ratio may be selected based upon the logical low or high signal levels on lines 240, 242, and 244 (labeled reggatedr7, reggatedr6, and reggatedr5, respectively). Voltage divider circuit 238 also provides an additional high-voltage signal (labeled vcos) used in high voltage circuits to keep the various components within their maximum voltage ratings.

Figure 2B:
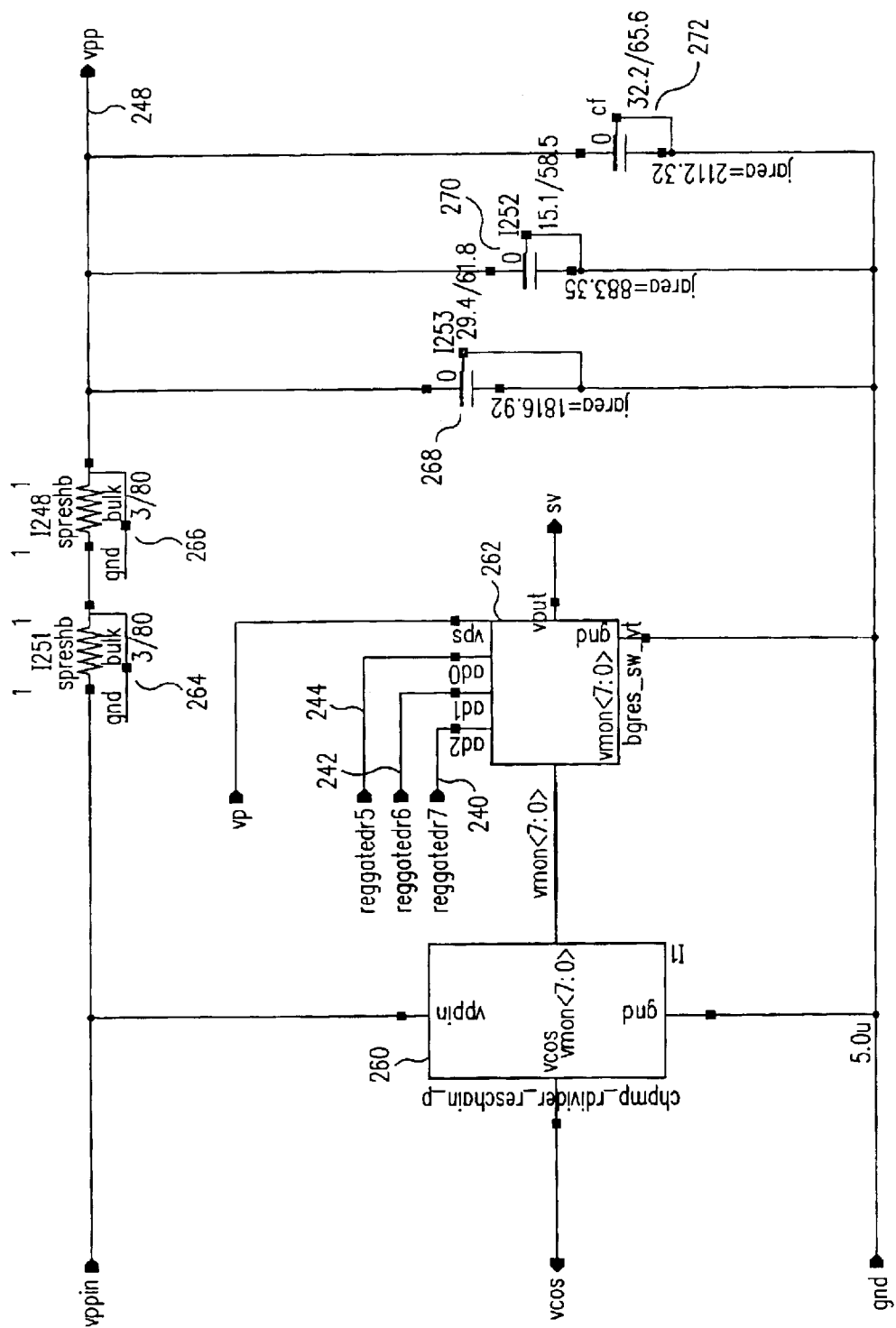
FIG. 2b shows an exemplary resistor network of a voltage divider circuit for the programmable charge pump in accordance with an embodiment of the present invention.

FIG. 2b shows an exemplary implementation of voltage divider circuit 238 for programmable charge pump 200 in accordance with an embodiment of the present invention. As shown in FIG. 2b, the programmable charge pump voltage (vppin) becomes the programmable charge-pump based supply voltage (vpp), with resistors 264 and 266 and capacitors 268, 270, and 272 providing additional filtering and current limiting protection.

A circuit block 260 receives the programmable charge pump voltage (vppin) and generates signals vmon (vmon<7:0>), which is provided to circuit block 262, and the high-voltage signal (vcos). Circuit block 262 provides the divided-down supply voltage (sv2, also labeled sv) to comparator 214 based upon signals on lines 240, 242, and 244 (labeled reggatedr7, reggatedr6, and reggatedr5 or ad2, ad1, and ad0, respectively).

Figure 2C:
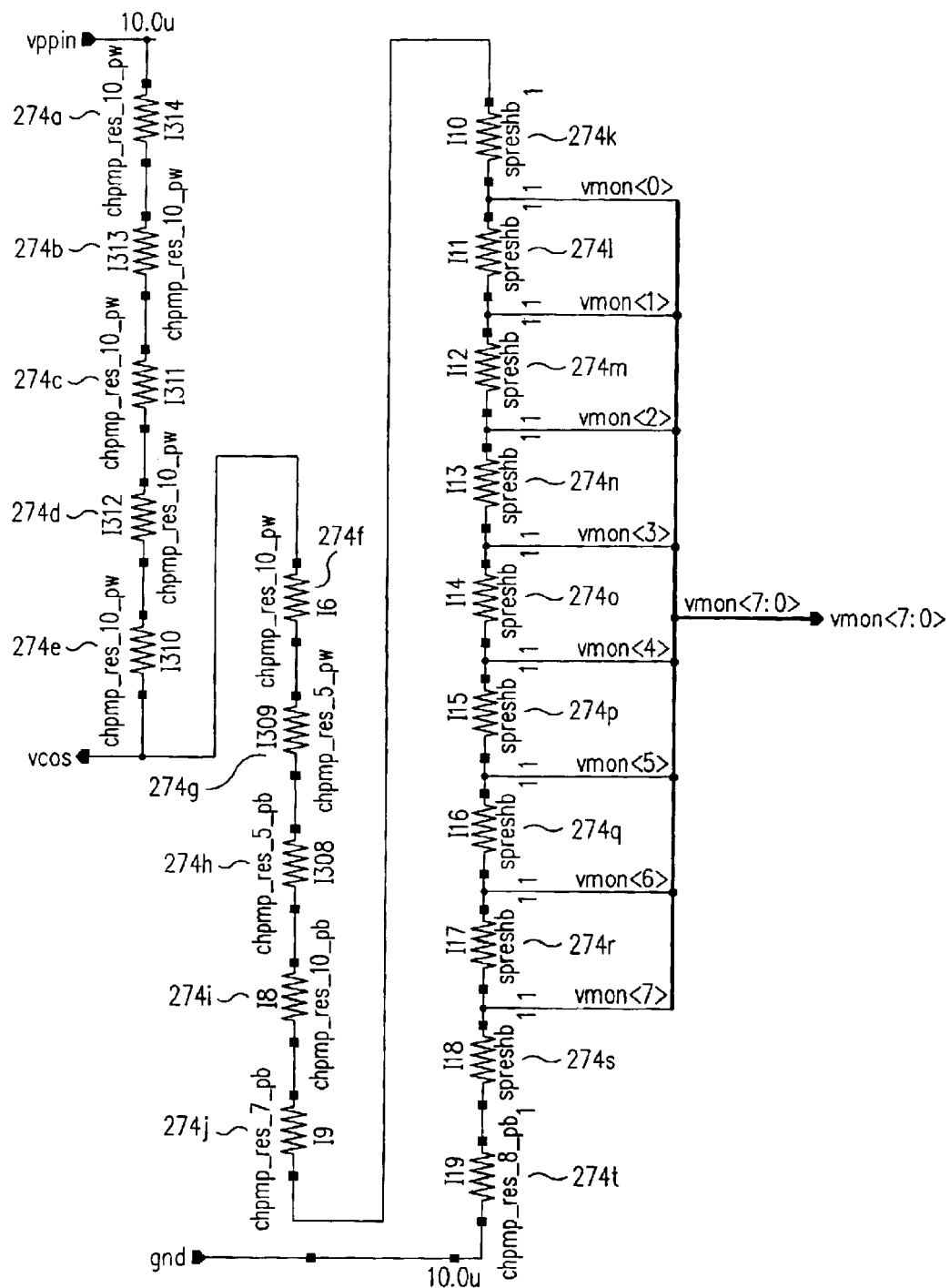
FIG. 2c shows an exemplary implementation of a portion of the resistor network in accordance with an embodiment of the present invention.

FIG. 2c shows an exemplary implementation of circuit block 260 in accordance with an embodiment of the present invention. Resistors 274 (which are separately referenced as 274a through 274t) are a series of resistors that provide a number of attenuated voltages from the programmable charge pump voltage (vppin). For example, the programmable charge pump voltage (vppin) is reduced by resistors 274a through 274e to provide the high-voltage signal (vcos). Resistors 274f through 274j reduce the voltage further with the signals vmon (vmon<7:0>) taken after corresponding resistors 274k through 274r.

Figure 2D:
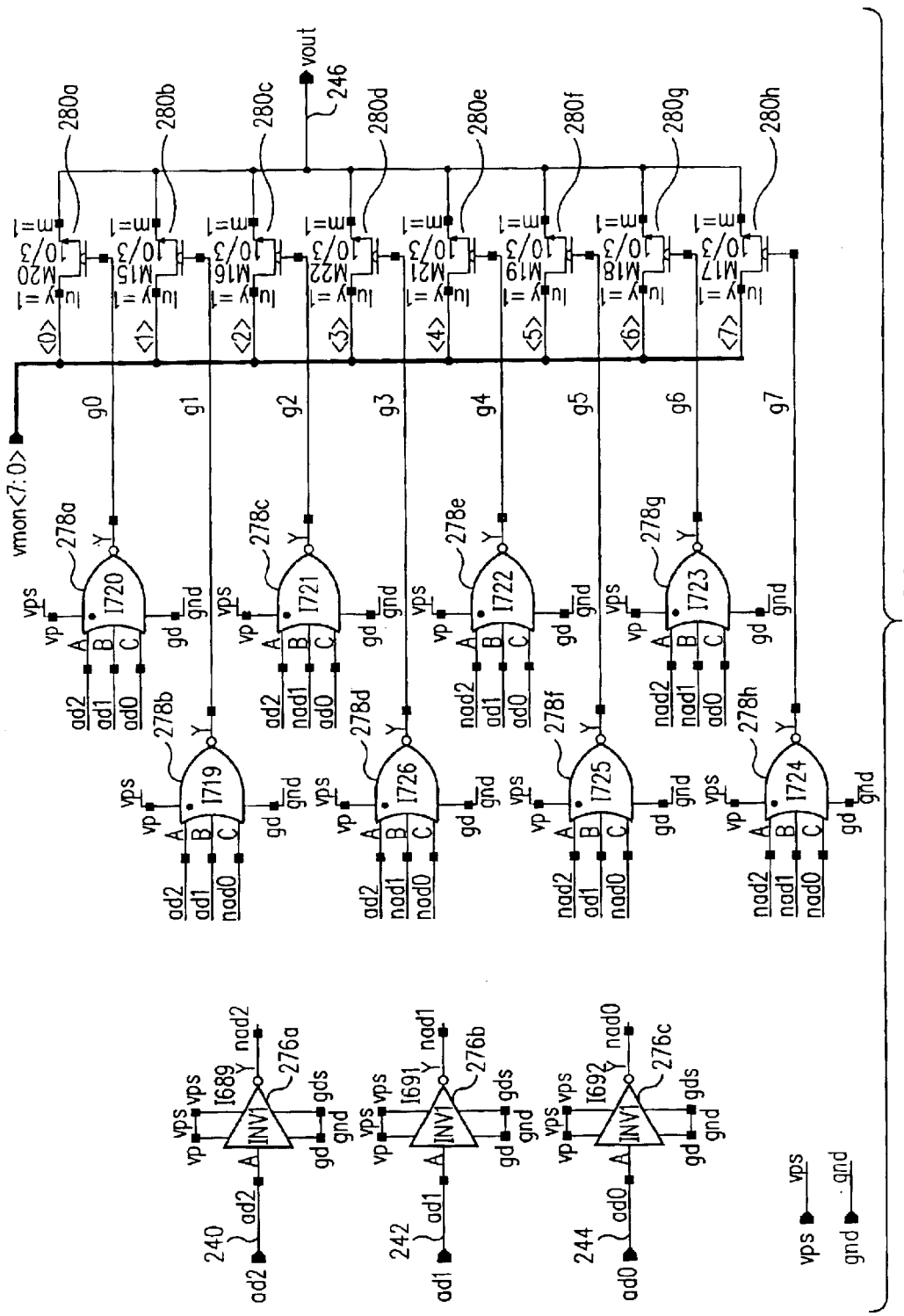
FIG. 2d shows an exemplary implementation of another portion of the resistor network in accordance with an embodiment of the present invention.

FIG. 2d shows an exemplary implementation of circuit block 262 in accordance with an embodiment of the present invention. The signals on lines 240, 242, and 244 (ad2, ad1, and ad0, respectively) or the inverse of the signals (labeled nad2, nad1, and nad0, respectively), after passing through corresponding inverters 276a, 276b, or 276c, enter gates 278a through 278h, as shown in FIG. 2d. Gates 278a through 278h control corresponding transistors 280a through 280h to select the signal vmon<0> through the signal vmon<7>, respectively, to be provided as the divided-down supply voltage (sv2 or labeled vout) on line 246. Thus, for this example, eight different attenuated voltages from the programmable charge pump voltage (vppin) may be selected for the feedback loop and comparison to the selectable reference voltages (vrefl and vrefh of FIG. 2).

Figure 3A:
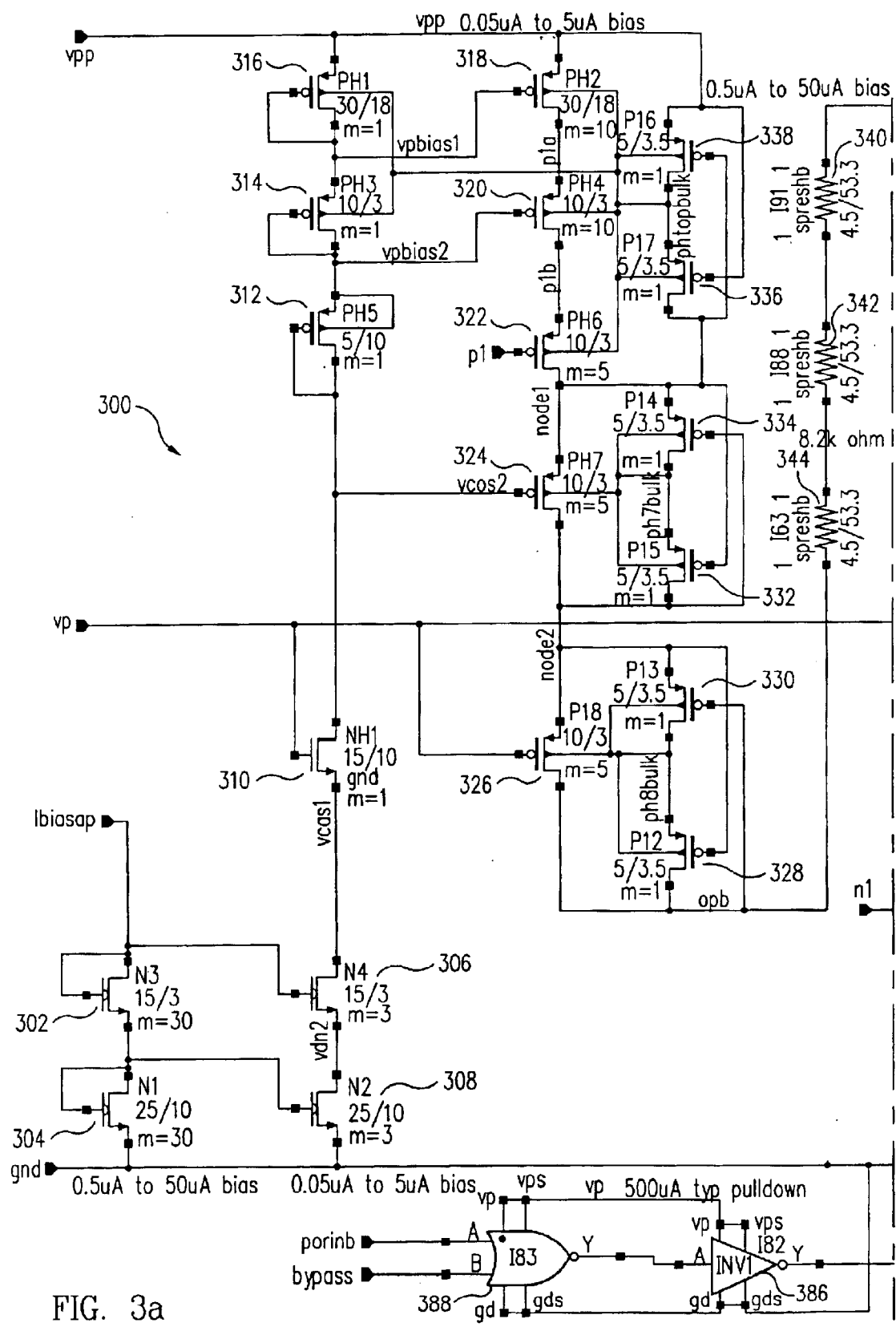
FIG. 3 shows a circuit schematic for a current source circuit in accordance with an embodiment of the present invention.
Figure 3B:
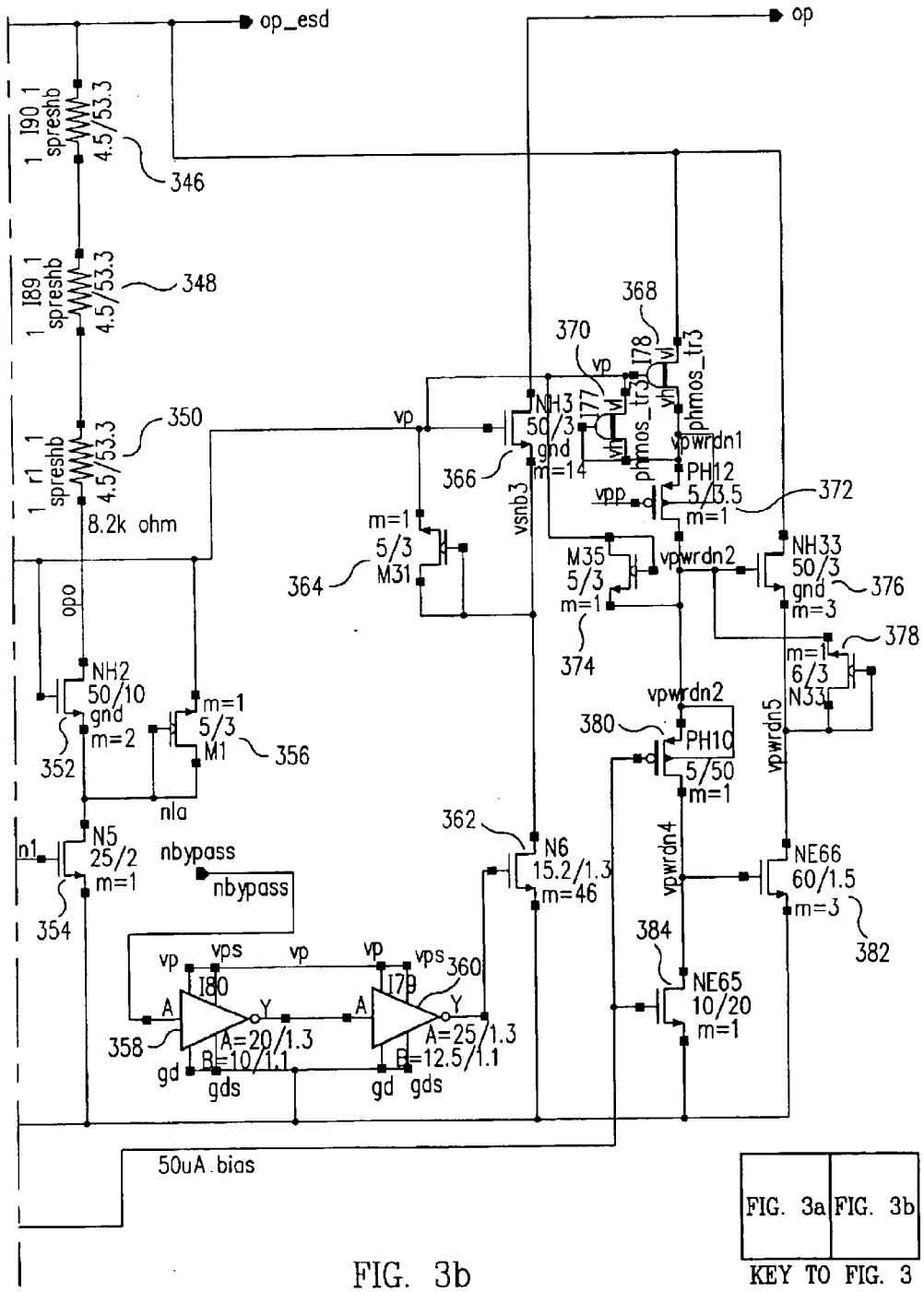

FIG. 3 shows a circuit schematic for a current source circuit 300 in accordance with an embodiment of the present invention. Current source circuit 300 is an exemplary circuit implementation for the remaining portions of power control circuit 100 of FIG. 1 (i.e., not including programmable regulated boost supply 104, whose exemplary circuit implementation was discussed in reference to FIGS. 2a through 2d). Current source circuit 300 receives the programmable boost-based supply voltage (vpp) (e.g., from programmable regulated boost supply 104 of FIG. 1 or programmable charge pump 200 of FIG. 2a) and provides an appropriate output current (e.g., to a gate terminal of power NFET 102 of FIG. 1) at an output node (labeled op_esd).

Current source circuit 300 includes transistors 302, 304, 306, and 308, which form a current mirror. As an example, transistor 304 is ten times larger than transistor 308 (i.e., 25/10 with a scaling (m) of 30 versus 3, respectively, as indicated in FIG. 3) and similarly for transistors 302 and 306 (i.e., 15/3 with a scaling (m) of 30 versus 3, respectively). Transistor 302 provides a reference voltage to bias transistor 306, which buffers transistor 308 from load modulations to keep a drain-to-source voltage of transistor 308 and its drain current nearly constant and effectively increasing the current source output impedance. Consequently, the current through transistors 302 and 304 will be ten times larger than the current through transistors 306 and 308 (e.g., 0.5 μA to 50 μA versus 0.05 μA to 5 μA, respectively).

Transistors 304 and 308 receive a reference current (Ibiasop) that is programmable and utilized by current source circuit 300 to determine the value of its output current (e.g., to the gate terminal of power NFET 102 of FIG. 1). For example and referring briefly to FIG. 4, a reference current source circuit 400 illustrates an exemplary circuit for generating the programmable reference current (Ibiasop) that is required by current source circuit. 300. Reference current source circuit 400 may be viewed as a portion or part of current source circuit 300

Reference current source circuit 400 includes transistors 402 through 464. Transistors 436, 440, 444, 448, 452, 456, 460, and 464 generate current references (e.g., such as exemplary values listed below each transistor) from a reference current (vnbias2), with transistors 434 and 436 creating a reference voltage for the current mirrors that include transistors 438 and 440 through transistors 458 and 460.

Figure 4:
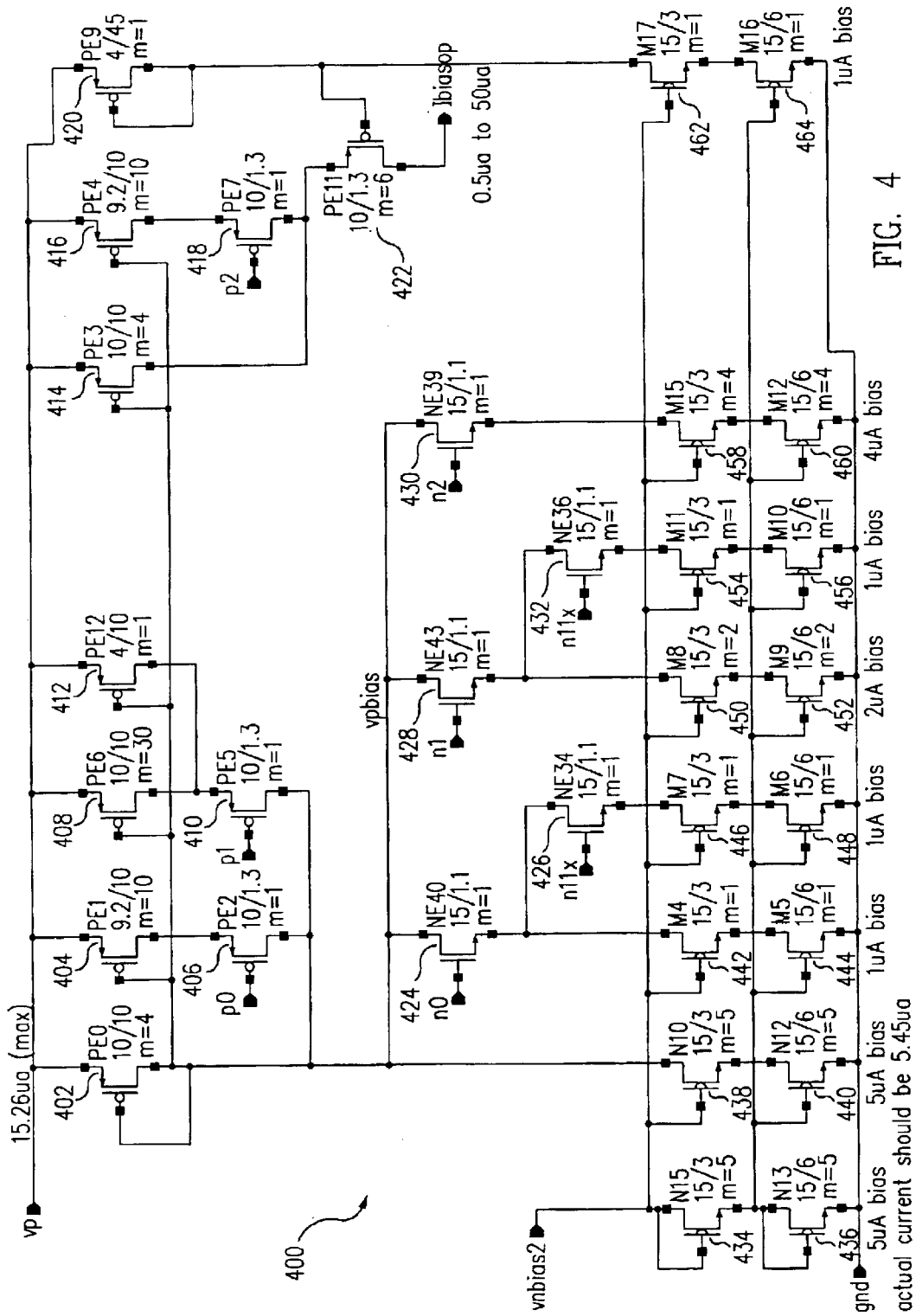
FIG. 4 shows a circuit schematic for a reference current circuit in accordance with an embodiment of the present invention.

For example, the amount of current through each transistor pair path (e.g., the path through transistors 438 and 440 or through transistors 446 and 448 or through transistors 458 and 460) will depend on the amount of current through transistors 434 and 436 and the size of the transistors in the transistor pair path relative to transistors 434 and 436. Specifically for one example, transistors 434 and 436 have a 15/3 size with a scaling (m) of 5 and a current of 5 μA (or approximately 5.45 μA) flowing through them. Consequently, transistors 450 and 452 having a 15/3 size with a scaling (m) of 2 will have a current of 2 μA flowing through them, as illustrated in FIG. 4.

Reference current source circuit 400 provides for a programmable selection of 32 equally distant reference currents (e.g., from 0.5 to 50 μA in 15% steps) to provide as an output for the programmable reference current (Ibiasop). The reference currents are selectable by asserting the appropriate signal (labeled p0, p1, p2, n0, n1, n2, n11x, and n11x) to a gate terminal of transistors 406, 410, 418, 424, 428, 430, 426, and 432, respectively, which determines the current mirror paths utilized among transistors 442 through 460 and the amount of current that is allowed to flow through the current mirror paths.

Returning to FIG. 3, the value of the programmable reference current (Ibiasop) and the size of transistors 302 through 368 will determine the amount of current flowing through transistors 310, 312, 314, and 316. Transistors 314 and 316 form a current mirror with transistors 318 and 320, with the amount of current flowing through transistors 318 and 320 determining the amount of current flowing through resistors 340, 342, and 344 and to, for example, an external NFET coupled to the output node (op_esd). Resistors 340, 342, and 344 limit the amount of current through and the voltage drop across transistors 318 through 326 to within safe operating limits (which will vary depending upon the process technology and other parameters).

Various circuit elements shown in FIG. 3 assist in providing the proper current through the output node (op_esd), provide process related protection, or provide optional additional functions, such as an open-drain output when a current for a high-voltage output is not required. For example, transistor 312 creates a reference voltage and protects from gate oxide breakdown and provides associated failure protection. Transistors 328, 330, 332, 334, 336, and 338 provide the correct (i.e., highest) substrate bias voltage for transistors 318, 320, 322, 324 and 326.

Furthermore, in addition to connecting the charge pump based supply voltage to the bulk terminal of transistors 318 through 326, transistors 328 through 338 also assist in connecting the voltage at the output node (op_esd) to the bulks of transistors 318 through 326 when in an open drain mode (i.e., when the programmable boost-based supply voltage (vpp) is not generated and the highest voltage is the voltage at the output node (op_esd)). If the bulks of transistors 318 through 326 were tied to the programmable boost-based supply voltage (vpp) in a conventional fashion, this would create a leakage current path through their respective drain/Nwell bulk diode. Thus, transistors 328 through 338 by being configured as shown in FIG. 3 prevent this leakage path.

Transistors 324 and 326 are arranged in a cascode fashion and provide process related functions for reliability. Transistor 322 determines whether current is allowed to flow to the output node (op_esd), depending upon whether a signal is asserted at its gate terminal (e.g., controls power sequencing function). Therefore, transistor 322 can be used to control whether, for example, an external NFET coupled to current source circuit 300 at the output node (op_esd) is switched on.

Transistors 352 and 354 along with resistors 346, 348, and 350 provide a current sink to discharge the output node (op_esd) and, for example, a gate terminal of an external NFET coupled to the output node (op_esd). Resistors 346, 348, and 350 limit the amount of current through and the voltage drop across transistors 352 and 354 to within safe operating limits (which will vary depending upon the process technology and other parameters). A data signal applied to a gate terminal of transistors 354 controls the application of the current sink. Similarly, elements 368 and 370 along with transistors 372, 374, 376, 378, 380, 382, and 384 are present to allow discharge of the output node (op_esd) in the event of a power loss and serve as protection devices. It should be noted that elements 368 and 370 are each equivalent to and can be replaced by or represent transistors 336 and 338 and their associated configuration and connections.

As noted above, current source circuit 300 may also be employed to provide an open-drain output at the output node (op_esd) rather than a high-voltage output for switching an external NFET. In general upon power-up, the high-voltage output is initially at a ground reference voltage, while during normal operation would provide a source current that would decrease to zero as the maximum output voltage is reached (e.g., as the gate capacitance of the external NFET is charged to the maximum desired voltage, which is equivalent to the programmable boost-based supply voltage (vpp)).

In contrast, the open-drain output upon power-up should provide high impedance. The open-drain output (i.e., a drain terminal of a FET) during normal operation would actively sink current (e.g., for a low logic level) or provide a high impedance (e.g., for a high logic level), but never source current.

For example to initiate the open-drain output, a logic gate (NOR) 388 receives a power on reset (porinb) signal and a bypass signal and provides an output via inverter 386 to transistors 380 and 384. Additionally, the bypass signal's complement (nbypass) is provided via inverters 358 and 360 to control transistor 362. This circuitry, along with transistors 364 and 366 determines whether an open-drain output is provided by current source circuit 300 at the output node (op_esd) via an output node (labeled op). The output node (op_esd) and the output node (op) both terminate at the same output terminal (i.e., connector 118 in FIG. 1, such as an integrated circuit pin or terminal), but the output node (op) bypasses an additional resistor (not shown, but for electrostatic discharge purposes) that is included in the path for the output node (op_esd).

In general and in accordance with an embodiment of the present invention, power control circuit 100 (FIG. 1) may be replicated within an integrated circuit to provide a number of high-voltage drivers (e.g., to control a corresponding number of external NFETs). The high-voltage drivers are independently programmable in both output current and maximum output voltage. Optionally, the high-voltage drivers are also configurable to operate as an open-drain logic output to provide greater functionality and flexibility of its use.

Power control circuit 100 employs programmable regulated boost supply 104 (e.g., a multi-stage charge pump) to generate a pump output voltage (e.g., the programmable charge-pump based supply voltage) high enough to meet the output voltage requirements (e.g., up to 7.5V above the supply voltage (vp)). The pump output voltage is divided down by a high-impedance resistive divider to an attenuated voltage level that can be compared to one or more one-chip reference voltages (e.g., 1.00 V or any other desired reference voltage levels, depending upon the application). As long as the attenuated voltage level is less than the selected on-chip reference voltage, programmable regulated boost supply 104 keeps pumping up and increasing the pump output voltage. Once the attenuated voltage level equals the on-chip reference voltage, the feedback loop stops the pump and the pump output voltage remains at its present level. If leakage or other loading effects reduce the pump output voltage, the feedback loop will detect this and keep the pump operating at the level necessary to maintain its desired pump output voltage level.

By providing multiple selection (feedback) points from the high-impedance resistive divider, the attenuation ratio can be programmably changed, resulting in different pump output voltages (with the pump output voltage corresponding to the highest voltage applied to an externally connected power NFET). Furthermore, as discussed herein, various circuit techniques have been employed to make the high-voltage drivers robust and reliable.

Power control circuit 100 also employs programmable current source 106 that is driven by the pump output voltage and switches on power NFET 102 at a desired rate. Programmable current source 106 also receives a precise and stable reference current (e.g., the reference current vnbias2) that is generated on chip. By programmably multiplying this reference current (e.g., by utilizing current mirror techniques), a selectable constant output current can be supplied, which when applied to the gate terminal of power NFET 102, switches on power NFET 102 at a certain nearly linear rate. Thus, by setting the current mirror ratio to a desired value, the output current and hence the turn-on rate of power NFET 102 can be increased or decreased. For example, reference current source circuit 400 provides 32 different current values that are selectable by a user.

Furthermore, as disclosed herein, programmable current source 106 permits the sourcing portion (i.e., p-channel) of the current mirror to operate off of the "high-side" of the pump output voltage. This allows the output node (op_esd) to be able to reach the desired high output voltage and at the desired rate and is possible because of circuit techniques (described and illustrated herein) that are employed to allow the last stage of the current mirror (or several of the last stages) to withstand the high voltage of the pump output voltage. Additionally, programmable current source 106 provides an alternative to the high-voltage driver mode by providing a "regular" logic output (i.e., open-drain output), which is protected from the high voltage by employing circuit techniques that offer adequate protection for the open-drain circuitry. Thus, either the open-drain output or the high-voltage output can be provided at the same pin or output terminal of the integrated circuit.

Overall, one or more embodiments of the present invention provide a high-voltage output driver, with its output voltage and its ramp rate being independently programmable. External over-voltage protection devices are not required for ensuring safe operation of an external power NFET due to a programmable voltage feedback loop controlling the internal power supply of a programmable current source. The programmable voltage feedback loop can be programmed to not exceed safe operating limits for the external power NFET. When a voltage level at a gate terminal of the power NFET reaches a desired voltage level (e.g., as defined by the programmable voltage feedback loop within the programmable regulated boost supply 104), a current provided by the programmable current source will automatically decrease to near zero and maintain the target output voltage level, thus ensuring voltage compliance of the power NFET.

One or more embodiments of the present invention may be incorporated into a power management system to assist in performing power supply sequencing requirements. For example, U.S. patent application Ser. No. 09/732,216 entitled "Programmable Power Management System and Method" filed Dec. 6, 2000 [hereinafter referred to as U.S. application Ser. No. 09/732,216], which is incorporated herein by reference in its entirety, could utilize one or more embodiments of the present invention. As an implementation example, power control circuit 100 (shown in FIG. 1 of the present application) may be incorporated into logic circuit 110 (of FIG. 1 of U.S. application Ser. No. 09/732, 216) to control transistor switches 128, 130, 132, and 134, with configuration information for programmable features of power control circuit 100 stored in memory device 106.

It should be understood by one skilled in the art that other implementations of one or more embodiments of the present invention could also be utilized into one or more of the embodiments described in U.S. application Ser. No. 09/732, 216. For example, power control circuit 100 may be incorporated into CPLD 202 of programmable power management system 200 (FIG. 2 of U.S. application Ser. No. 09/732,216) and work in conjunction with or replace FET drivers 207 and/or charge pump 210.

The programmed settings for power control circuit 100 (e.g., desired maximum voltage or current) may be accessible or programmable via a JTAG port (e.g., ISP/JTAG interface 230 or serial interface 224) and supported by on-chip EEPROM memory (e.g., tag memory 228), thus enabling true in-system programmability, which is very desirable in both development and production scenarios. Consequently, a compliance voltage for an external NFET can be controlled without the need for external components and the specific configuration information can be stored in non-volatile memories for immediate use after power up when the integrated circuit containing an embodiment of the present invention is the only integrated circuit operational.

Figure 5:
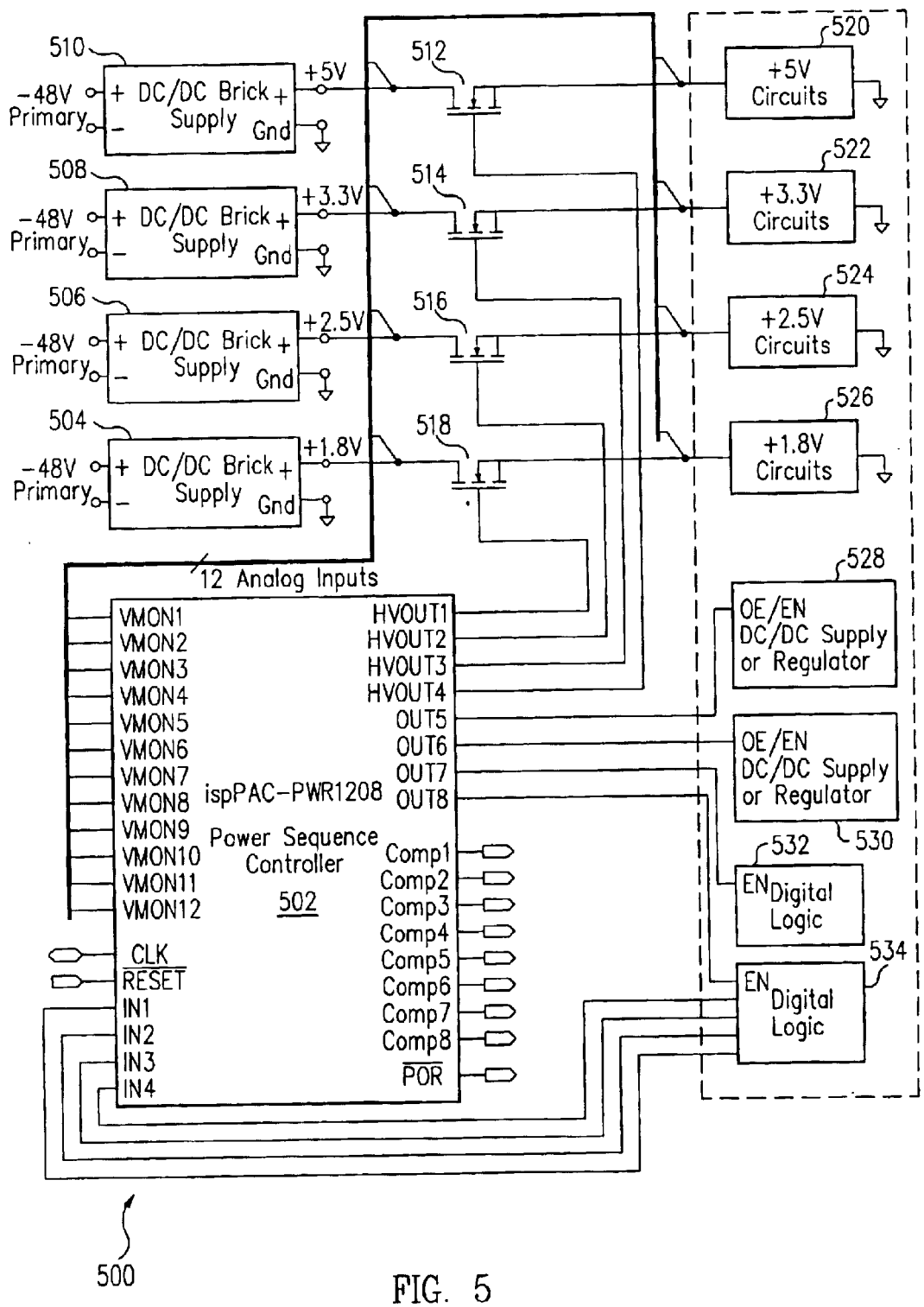
FIG. 5 shows a block diagram illustrating a power-sequencing application in accordance with an embodiment of the present invention.

FIG. 5 shows a block diagram illustrating a power-sequencing application (PSA) 500 in accordance with an embodiment of the present invention. PSA 500 incorporates in-system-programmable (ISP) logic and ISP analog circuits to perform power supply sequencing and monitoring and represents an exemplary application for one or more embodiments of the present invention (e.g., power control circuit 100).

PSA 500 includes a power sequence controller 502 that has 12 analog input terminals (labeled VMON1 through VMON12), four digital input terminals (labeled IN1 through IN4), eight comparator output terminals (labeled Comp1 through Comp8), four logic output terminals (labeled OUT5 through OUT8), and four high-voltage output terminals (labeled HVOUT1 through HVOUT4). For example, the four digital input terminals can be used for interfacing to other control circuits or digital logic (e.g., with digital logic 534) and the 12 analog input terminals can be used to measure the supply voltage limits and circuit voltages, as shown in FIG. 5 for power supplies 504 through 510 and circuits 520 through 526. The four logic output terminals can be used for power supply sequencing, such as to enable DC/DC supply/regulators 528 and 530 and digital logic 532 and 534.

The four high-voltage output terminals can be configured in a gate driver mode (i.e., provide a high-voltage output signal) or in a digital mode (e.g., provide an open drain logic output signal). In the gate driver mode, as shown in FIG. 5, the four high-voltage output terminals drive corresponding external NFETs 512 through 518 that serve as switches to control the voltage ramp-up of the target board (i.e., circuits 520 through 526, respectively). Power sequence controller 502 may incorporate one or more embodiments of the present invention to assist in providing the four high-voltage output terminal signals. For example, power sequence controller 502 may incorporate four power control circuits 100 to provide the four high-voltage output terminal signals. Additional details of this exemplary application can be found in the "In-System-Programmable Analog Circuit (ispPAC-PWR1208) Advanced Data Sheet" (Rev 9.16.02) by Lattice Semiconductor Corporation, which is incorporated herein by reference in its entirety.

As discussed herein, conventional devices typically require the use of external clamping (i.e., protection) devices to limit the gate voltage and external shunt capacitors to slow down the turn-on time of the power-NFET, while providing limited programmability. In contrast, one or more embodiments of the present invention provide a combined on-chip programmable current source and an on-chip programmable high-voltage generator (e.g., charge pump). Consequently, the techniques discussed herein avoid the need for external clamping or shunting devices. Thus, by making both the turn-on ramp rate and the maximum output voltage programmable, the user can select the most desirable settings and operate the system safely without the need for external components (other than the power MOSFET itself).

Embodiments described above illustrate but do not limit the invention. It should also be understood that numerous modifications and variations are possible in accordance with the principles of the present invention. Accordingly, the scope of the invention is defined only by the following claims.

We claim:

1. A circuit comprising:
    a regulated boost supply adapted to provide a programmable supply voltage; and
    a current source, coupled to the regulated boost supply, adapted to receive the programmable supply voltage and provide a programmable current, wherein the programmable current is set independently of the programmable supply voltage.

2. The circuit of claim 1, wherein the programmable supply voltage determines a desired output voltage of the circuit, and the programmable current determines a desired output current of the circuit to control a transistor for power supply sequencing.

3. The circuit of claim 2, wherein the desired output voltage determines a desired voltage level provided to the transistor, and the desired output current determines a voltage ramp rate for the transistor.

4. The circuit of claim 2, further comprising memory, coupled to the regulated boost supply and to the current source, adapted to store data for selecting the desired output voltage and the desired output current.

5. The circuit of claim 1, wherein the regulated boost supply further comprises a selectable resistor network for attenuating the programmable supply voltage to compare with a reference voltage to form a feedback loop for maintaining a desired setting for the programmable supply voltage.

6. The circuit of claim 2, further comprising a current sink, coupled to the current source, adapted to discharge the transistor.

7. The circuit of claim 1, further comprising an open drain circuit, coupled to the current source, adapted to provide an open drain logic output if the programmable current is not provided.

8. The circuit of claim 1, wherein the regulated boost supply comprises a charge pump or a boost converter.

9. The circuit of claim 1, wherein the programmable current is based on a selectable reference current.

10. The circuit of claim 1, wherein the regulated boost supply is adapted to receive a first supply voltage and provide a voltage level for the programmable supply voltage greater than a voltage level of the first supply voltage.

11. A method of switching a transistor for power sequencing applications, the method comprising:
    providing a programmable voltage that determines a desired voltage applied to a gate terminal of the transistor; and
    providing a programmable current that receives the programmable voltage and independently determines a desired voltage ramp rate at the gate terminal of the transistor.

12. The method of claim 11, further comprising providing a current sink adapted to selectively discharge the gate terminal of the transistor.

13. The method of claim 12, further comprising providing an open drain logic output if the programmable current is not provided.

14. The method of claim 11, further comprising storing data that determines a voltage level and a current level for the programmable voltage and the programmable current, respectively.

15. A power sequencing circuit comprising:
    a regulated boost supply adapted to provide a programmable voltage that determines a desired voltage applied to a gate terminal of a transistor;

a current source, coupled to the regulated boost supply, adapted to receive the programmable voltage and independently provide a programmable current that determines a desired voltage ramp rate at the gate terminal of the transistor; and a current sink, coupled to the current source, adapted to selectively discharge the gate terminal of the transistor.

16. The power sequencing circuit of claim 15, further comprising an open drain circuit, coupled to the current source, adapted to provide an open dram logic output if the programmable current is not provided.

17. The power sequencing circuit of claim 15, wherein the regulated boost supply further comprises a resistor network adapted to provide a selectable attenuated voltage of the programmable voltage to compare to a reference voltage and provide a feedback loop for the regulated boost supply.

18. The power sequencing circuit of claim 15, further comprising memory, coupled to the regulated boost supply and to the current source, adapted to store data for selecting a value for the programmable voltage and for the programmable current.

19. The power sequencing circuit of claim 15, wherein the regulated boost supply is a charge pump or a boost converter.

20. A circuit comprising:

means for providing a programmable voltage that determines a desired voltage applied to a gate terminal of a transistor; and means for receiving the programmable voltage and providing a programmable current that determines a desired voltage ramp rate at the gate terminal of the transistor, wherein the programmable current is based on a selectable reference current which is independent of the supply voltage.

21. The circuit of claim 20, further comprising:

means for discharging the gate terminal of the transistor; and means for providing an open drain logic output signal if the programmable current is not provided.

22. The circuit of claim 20, further comprising means for storing data for selecting a value for the programmable voltage and for the programmable current.

23. A circuit comprising:

a regulated boost supply adapted to provide supply voltage;

a current source, coupled to the regulated boost supply, adapted to receive the supply voltage and provide a programmable current;

a current sink, coupled to the current source, adapted to discharge the transistor; and an open drain circuit, coupled to the current source, adapted to provide an open drain logic output if the programmable current is not provided.

24. The circuit of claim 23, wherein the supply voltage determines an output voltage of the circuit, and the programmable current determines a desired output current of the circuit to control a transistor for power supply sequencing.

25. A circuit comprising:

a regulated boost supply adapted to provide a programmable supply voltage;

a current source, coupled to the regulated boost supply, adapted to receive the programmable supply voltage and provide a current;

a current sink, coupled to the current source, adapted to discharge the transistor; and an open drain circuit, coupled to the current source, adapted to provide an open drain logic output if the current is not provided.

26. The circuit of claim 25, wherein the programmable supply voltage determines a desired output voltage of the circuit, and the current controls a transistor for power supply sequencing.

27. A circuit comprising:

a regulated boost supply adapted provide a supply voltage, the boost supply including a feedback loop responsive to a reference voltage for maintaining a desired setting for the supply voltage;

a current source, coupled to the regulated boost supply, adapted to receive the supply voltage and provide a current, wherein the current is provided to a transistor to control power supply sequencing;

a current sink, coupled to the current source, adapted to discharge the transistor; and an open drain circuit, coupled so the current source, adapted to provide an open drain logic output if the current is not provided.

28. The circuit of claim 27, wherein the feedback loop includes a resistor divider network for attenuating a voltage level of the supply voltage for comparison with the reference voltage.

29. A circuit comprising:

a regulated boost supply adapted to provide a programmable supply voltage; and a current source, coupled to the regulated boost supply, adapted to receive the programmable supply voltage and a reference current and provide an output current that is a multiple of the reference current, wherein the programmable supply voltage sets a maximum output voltage for the circuit and the current source independently sets a ramp rate for the output voltage.

30. The circuit of claim 29, wherein the output current is a multiple of the reference current by utilizing a current mirror configuration.

31. The circuit of claim 29, wherein the output current is provided to a transistor to control power supply sequencing, and the circuit further comprises:

a current sink, coupled to the current source, adapted to discharge the transistor; and an open drain circuit, coupled to the current source, adapted to provide an open drain logic output if the output current is not provided.

* * * * *

UNITED STATES PATENT AND TRADEMARK OFFICE
CERTIFICATE OF CORRECTION

PATENT NO. : 6,791,394 B2
DATED : September 14, 2004
INVENTOR(S) : Frederic N.F. Deboes et al.

It is certified that error appears in the above-identified patent and that said Letters Patent is hereby corrected as shown below:

Column 13,
Line 10, "dram" should be -- drain --.

Signed and Sealed this

Twenty-fourth Day of May, 2005

JON W. DUDAS
*Director of the United States Patent and Trademark Office*